(12) United States Patent
Lee

(10) Patent No.: US 11,474,610 B2
(45) Date of Patent: Oct. 18, 2022

(54) SYSTEMS AND METHODS FOR GENERATING DYNAMIC OBSTACLE COLLISION WARNINGS FOR HEAD-MOUNTED DISPLAYS

(71) Applicant: Meta Platforms Technologies, LLC, Menlo Park, CA (US)

(72) Inventor: Eugene Lee, Mountain View, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/417,299

(22) Filed: May 20, 2019

(65) Prior Publication Data

US 2020/0371596 A1 Nov. 26, 2020

(51) Int. Cl.
| | | |
|---|---|---|
| *G06F 3/01* | (2006.01) | |
| *G02B 27/00* | (2006.01) | |
| *G02B 27/01* | (2006.01) | |
| *G06F 9/54* | (2006.01) | |

(52) U.S. Cl.
CPC ......... *G06F 3/017* (2013.01); *G02B 27/0093* (2013.01); *G02B 27/0172* (2013.01); *G06F 3/012* (2013.01); *G06F 3/013* (2013.01); *G06F 9/542* (2013.01); *G02B 2027/0138* (2013.01)

(58) Field of Classification Search
CPC .... H04N 5/23238; G02B 27/01; G06T 19/00; G06F 3/01
See application file for complete search history.

(56) References Cited

U.S. PATENT DOCUMENTS

| | | | |
|---|---|---|---|
| 9,754,167 B1* | 9/2017 | Holz | G06T 19/006 |
| 2013/0328762 A1 | 12/2013 | McCulloch et al. | |
| 2016/0124502 A1* | 5/2016 | Sawyer | G02B 27/017 |
| | | | 345/633 |
| 2016/0171771 A1 | 6/2016 | Pedrotti et al. | |
| 2017/0282062 A1* | 10/2017 | Black | A63F 13/428 |
| 2018/0204380 A1* | 7/2018 | Kumar | G06T 19/003 |
| 2018/0373349 A1 | 12/2018 | Okumura et al. | |
| 2019/0033989 A1 | 1/2019 | Wang et al. | |
| 2019/0324448 A1* | 10/2019 | Pohl | H04N 5/23238 |

OTHER PUBLICATIONS

International Search Report and Written Opinion on PCT/US2020/033641 dated Aug. 10, 2020 (14 pages).

* cited by examiner

*Primary Examiner* — Cao H Nguyen

(74) *Attorney, Agent, or Firm* — Foley & Lardner LLP

(57) ABSTRACT

A system includes one or more sensors configured to detect first motion data of a head mounted display (HMD) and second motion data of a hand device associated with the HMD. The system includes processing circuitry configured to identify one or more obstacles in an environment around the HMD. The processing circuitry is configured to provide, using the HMD, display data representing a warning regarding potential collision with the one or more obstacles in response to at least one of the first motion data or the second motion data and a distance between the HMD and the one or more obstacles or the hand device and the one or more obstacles.

20 Claims, 4 Drawing Sheets

SYSTEMS AND METHODS FOR GENERATING DYNAMIC OBSTACLE COLLISION WARNINGS FOR HEAD-MOUNTED DISPLAYS

FIELD OF THE DISCLOSURE

The present disclosure relates generally to virtual reality (VR) systems. More particularly, the present disclosure relates to systems and methods for generating dynamic obstacle collision warnings for head-mounted displays (HMDs).

BACKGROUND

The present disclosure relates generally to virtual reality (VR) systems and augmented reality (AR) systems. AR and VR systems can be used to present various images, including three-dimensional (3D) images, to a user. For example, AR and VR headsets can be used to present images to the user in a manner that can be perceived as a virtual, immersive environment. The VR headset may occlude the user's view of a real world environment in which the user is located.

SUMMARY

Various aspects of the present disclosure relate to systems and methods that can dynamically generate obstacle collision warnings in real time, such as to present such warnings to a user wearing and operating a VR or AR headset. For example, the system can provide visual cues in a VR display to alert a user when they are approach real world obstacles or boundaries, such as walls. The system can generate the visual cues based on motion parameters such as velocity associated with head movement and velocity associated with hand movement, as well as predetermined or user-defined data regarding real world obstacle locations. The system can use different estimations for the head and hands, such as to weigh head motion more heavily than hand motion, as the position of the head can more accurately reflect an overall position of the user. The system can limit the position estimation based on an expected profile of human reach, such as P95 or P99 of human reach, and use a minimum distance of head movement for activating the visual cues.

The system can determine a score (e.g., danger score) based on the estimated position of the user relative to the obstacles, which can be converted into an angle representing an extent of the obstacle in the field of view of the user, and which can be positioned based on a direction of movement of the user.

The system can selectively present the visual cues in a manner that balances the alert function with the need to minimize breaking of the immersive experience for the user that could result from the visual cues. For example, the system can minimize the visual impact of the guardian directly in front of the user's eyes while providing a peripheral visual cue to help alert users to obstacles to the sides or behind the user that would otherwise be difficult to notice. The system can increase the contrast of the peripheral information to make more easy for the user to recognize. The system can fade out the visual cues to a minimal cue (e.g., small indicator around the head or controller) when the user is not moving.

The system can assign minimum radiuses to the head and hands to act as a buffer from the obstacles. The head radius can be relatively large compared to the hand radius. The buffer can ensure that the visual cues are presented with sufficient space so that, for example, a user's hand would not touch a physical obstacle before the visual cue is displayed with maximum opacity.

The system can smooth the velocity data (e.g., for hands) to avoid false positives. For example, the system can take a time average of velocity over a predetermined period of time (e.g., 0.15 seconds), which can reduce the likelihood that movements that have high velocity but short duration and thus short actual distance (e.g., flicks of the controller) result in false positive triggering of the visual cues.

The system can dynamically scale the conditions that trigger the magnitude of alert display based on various factors, such as the size of the play space, recent movements that have taken place, app-specific behaviors, user-specific training models, and feedback indicating success or failure of the system. The system can use depth mapping to calculate velocity information, such as to detect moving obstacles.

At least one aspect relates to a method. The method can include detecting, by one or more sensors, first motion data of a head mounted display (HMD) and second motion data of a hand device associated with the HMD. The method can include identifying, by one or more processors, one or more obstacles in an environment around the HMD. The method can include providing, by the one or more processors using the HMD, display data representing a warning regarding potential collision with the one or more obstacles in response to at least one of the first motion data or the second motion data and a distance between the HMD and the one or more obstacles or the hand device and the one or more obstacles.

At least one aspect relates to a system. The system can include one or more sensors configured to detect first motion data of a head mounted display (HMD) and second motion data of a hand device associated with the HMD. The system can include processing circuitry configured to identify one or more obstacles in an environment around the HMD. The processing circuitry can be configured to provide, using the HMD, display data representing a warning regarding potential collision with the one or more obstacles in response to at least one of the first motion data or the second motion data and a distance between the HMD and the one or more obstacles or the hand device and the one or more obstacles.

At least one aspect relates to a head mounted display (HMD). The HMD can include a display. The HMD can include processing circuitry configured to cause the display to provide a warning regarding potential collision with an obstacle in an environment of the HMD in response to motion data associated with movement of a user of the HMD and a distance to the obstacle.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Figure 1:
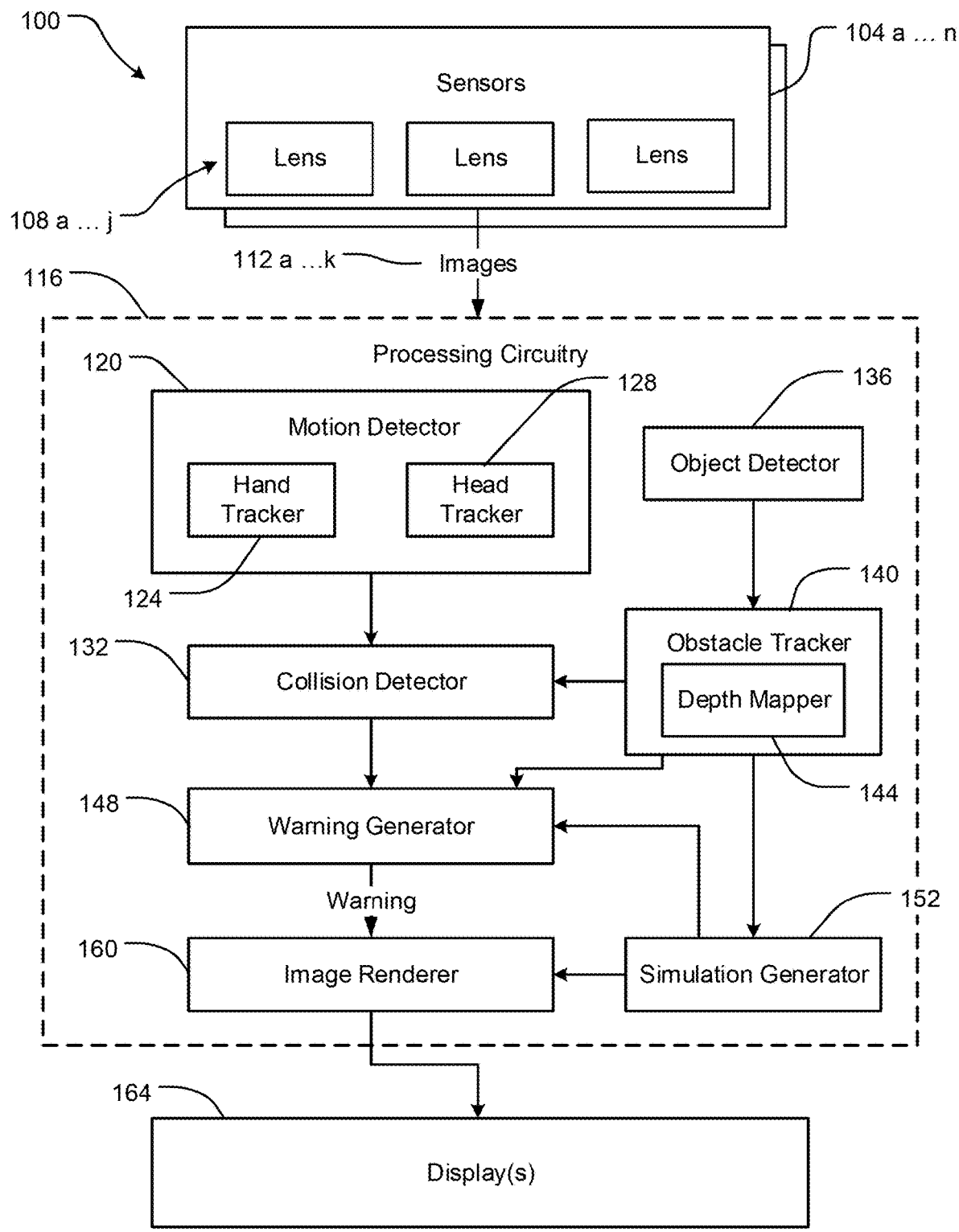
FIG. 1 is a block diagram of a display system according to an implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

AR and VR systems can use an HMD (may also be referred to as a head-worn display (HWD)) to present images to a user to represent a virtual environment (e.g., simulated environment). It can be useful for the user experience for the virtual environment to be immersive. The HMD can present the images so that the images are perceived with realistic depth. For example, the HMD can be used to present images that can be viewed stereoscopically, such as by sequentially or simultaneously presenting left eye images and right eye images, enabling a user to perceive a 3D environment. For example, the VR system can generate the images based on operating an application that generates display data regarding the virtual environment, and updates the display data responsive to interactions of the user with the virtual environment. Such interactions can include movement in the real world that is detected by motion sensors of the VR system, and interactions with items presented in the virtual environment. The VR system can detect a user moving by walking in the real world and moving a hand, and can generate and update the display data based on detecting such information. The VR system can include the HMD (e.g., headset), which can be worn by the user to present the display data to the user, as well as one or more hand devices, such as hand-held controllers, that can be manipulated by the user as the user interacts with the virtual environment. The HMD and hand device may each include motion sensors that can generate motion data, such as velocity or acceleration data, regarding movement of the head and hands of the user.

Wearing the HMD can obstruct the user's view of the obstacles in the real world environment. For example, users can accidentally strike, walk into, or trip over obstacles or boundaries. Warnings, such as a safety overlay, can be presented to the user to help the user avoid such collisions. However, displaying the warnings too early or too frequently can result in loss of immersion, and can make it difficult to identify the significance of the warning if it is presented when the likelihood of collision is low. For example, immersion may be lost when representations of real-world walls are faded into view via the HMD, replacing the virtual environment in which the user expects to be immersed. Similarly, displaying the warnings too late may make it difficult for the user to react in time to avoid collisions. In some instances, users manually set obstacle boundaries based on user preferences, such as by drawing virtual boundaries that may be inset from real world obstacles (which can reduce immersion); some users may turn off warning systems rather than lose immersion. AR and VR systems may be untethered, which can enable users to have greater freedom of movement but may also increase the likelihood of collisions.

Systems and methods in accordance with certain aspects of the present solution can use the motion data corresponding to movement of the head, hands, or any combination thereof, along with information regarding obstacles present in the real world in which the user is moving, to generate obstacle collision warnings for display by the HMD in the virtual environment while the user is moving in the real world environment that can effectively maintain immersion while also providing useful and timely warnings. In some embodiments, . . .

the system can provide visual cues in a VR display to alert a user when they are approach real world obstacles, such as walls. The system can generate the visual cues based on motion parameters such as velocity associated with head movement and velocity associated with hand movement, as well as predetermined or user-defined data regarding real world obstacle locations. The system can use different estimations for the head and hands, such as to weigh head motion more heavily than hand motion, as the position of the head can more accurately reflect an overall position of the user. The system can limit the position estimation based on an expected profile of human reach, such as P95 or P99 of human reach, and use a minimum distance of head movement for activating the visual cues.

The system can determine a score (e.g., danger score) based on the estimated position of the user relative to the obstacles, which can be converted into an angle representing an extent of the obstacle in the field of view of the user, and which can be positioned based on a direction of movement of the user.

The system can selectively present the visual cues in a manner that balances the alert function with the need to minimize breaking of the immersive experience for the user that could result from the visual cues. For example, the system can minimize the visual impact of the guardian directly in front of the user's eyes while providing a peripheral visual cue to help alert users to obstacles to the sides or behind the user that would otherwise be difficult to notice. The system can increase the contrast of the peripheral information to make more easy for the user to recognize. The system can fade out the visual cues to a minimal cue (e.g., small indicator around the head or controller) when the user is not moving.

The system can assign minimum radiuses to the head and hands to act as a buffer from the obstacles. The head radius can be relatively large compared to the hand radius. The buffer can ensure that the visual cues are presented with sufficient space so that, for example, a user's hand would not touch a physical obstacle before the visual cue is displayed with maximum opacity.

The system can smooth the velocity data (e.g., for hands) to avoid false positives. For example, the system can take a time average of velocity over a predetermined period of time (e.g., 0.15 seconds), which can reduce the likelihood that movements that have high velocity but short duration and thus short actual distance (e.g., flicks of the controller) result in false positive triggering of the visual cues.

The system can dynamically scale the conditions that trigger the magnitude of alert display based on various factors, such as the size of the play space, recent movements that have taken place, app-specific behaviors, user-specific training models, and feedback indicating success or failure of the system. The system can use depth mapping to calculate velocity information, such as to detect moving obstacles.

Referring now to FIG. 1, a system 100 can include a plurality of sensors 104a . . . n, processing circuitry 116, and one or more displays 164. The system 100 can be implemented using the HMD system 200 described with reference to FIG. 2. The system 100 can be implemented using the computing environment described with reference to FIG. 4. The system 100 can incorporate features of and be used to implement features of AR and VR systems. At least some of the processing circuitry 116 can be implemented using a graphics processing unit (GPU). The functions of the processing circuitry 116 can be executed in a distributed manner using a plurality of processing units.

The processing circuitry 116 may include one or more circuits, processors, and/or hardware components. The processing circuitry 116 may implement any logic, functions or instructions to perform any of the operations described herein. The processing circuitry 116 can include any type and form of executable instructions executable by any of the circuits, processors or hardware components. The executable instructions may be of any type including applications, programs, services, tasks, scripts, libraries processes and/or firmware. Any of the components of the processing circuitry 116 including but not limited to the image renderer 160, warning generator 148, obstacle tracker 140, object detector 136, motion detector 120, and collision detector 132 may be any combination or arrangement of hardware, circuitry and executable instructions to perform their respective functions and operations. At least some portions of the processing circuitry 116 can be used to implement image processing executed by the sensors 104.

The sensors 104a . . . n can be image capture devices or cameras, including video cameras. The sensors 104a . . . n may be cameras that generate images of relatively low quality (e.g., relatively low sharpness, resolution, or dynamic range), which can help reduce the SWAP of the system 100. For example, the sensors 104a . . . n can generate images having resolutions on the order of hundreds of pixels by hundreds of pixels. At the same time, the processes executed by the system 100 as described herein can be used to generate display images for presentation to a user that have desired quality characteristics, including depth characteristics.

The sensors 104a . . . n (generally referred herein as sensors 104) can include any type of one or more cameras. The cameras can be visible light cameras (e.g., color or black and white), infrared cameras, or combinations thereof. The sensors 104a . . . n can each include one or more lenses 108 a . . . j generally referred herein as lens 108). In some embodiments, the sensor 104 can include a camera for each lens 108. In some embodiments, the sensor 104 include a single camera with multiple lenses 108 a . . . j. In some embodiments, the sensor 104 can include multiple cameras, each with multiple lenses 108. The one or more cameras of the sensor 104 can be selected or designed to be a predetermined resolution and/or have a predetermined field of view. In some embodiments, the one or more cameras are selected and/or designed to have a resolution and field of view for detecting and tracking objects, such as in the field of view of a HMD. The one or more cameras may be used for multiple purposes, such as tracking objects in a scene or an environment captured by the image capture devices and performing the collision detection techniques described herein.

The one or more cameras of the sensor 104 and lens 108 may be mounted, integrated, incorporated or arranged on an HMD to correspond to a left-eye view of a user or wearer of the HMD and a right-eye view of the user or wearer. For example, an HMD may include a first camera with a first lens mounted forward-facing on the left side of the HMD corresponding to or near the left eye of the wearer and a second camera with a second lens mounted forward-facing on the right-side of the HMD corresponding to or near the right eye of the wearer. The left camera and right camera may form a front-facing pair of cameras providing for stereographic image capturing. In some embodiments, the HMD may have one or more additional cameras, such as a third camera between the first and second cameras an offers towards the top of the HMD and forming a triangular shape between the first, second and third cameras. This third camera may be used for triangulation techniques in performing the depth buffer generations techniques of the present solution, as well as for object tracking.

The system 100 can include a first sensor (e.g., image capture device) 104a that includes a first lens 108a, the first sensor 104a arranged to capture a first image 112a of a first view, and a second sensor 104b that includes a second lens 108b, the second sensor 104b arranged to capture a second image 112b of a second view. The first view and the second view may correspond to different perspectives, enabling depth information to be extracted from the first image 112a and second image 112b. For example, the first view may correspond to a left eye view, and the second view may correspond to a right eye view. The system 100 can include a third sensor 104c that includes a third lens 108c, the third sensor 104c arranged to capture a third image 112c of a third view. As described with reference to FIG. 2, the third view may correspond to a top view that is spaced from an axis between the first lens 108a and the second lens 108b, which can enable the system 100 to more effectively handle depth information that may be difficult to address with the first sensor 104a and second sensor 104b, such as edges (e.g., an edge of a table) that are substantially parallel to the axis between the first lens 108a and the second lens 108b.

Light of an image to be captured by the sensors 104a . . . n can be received through the one or more lenses 108 a . . . j. The sensors 104a . . . n can include sensor circuitry, including but not limited to charge-coupled device (CCD) or complementary metal-oxide-semiconductor (CMOS) circuitry, which can detect the light received via the one or more lenses 108a . . . j and generate images 112a . . . k based on the received light. For example, the sensors 104a . . . n can use the sensor circuitry to generate the first image 112a corresponding to the first view and the second image 112b corresponding to the second view. The one or more sensors 104a . . . n can provide the images 112a . . . k to the processing circuitry 116. The one or more sensors 104a . . . n can provide the images 112a . . . k with a corresponding timestamp, which can facilitate synchronization of the images 112a . . . k when image processing is executed on the images 112a . . . k.

Figure 2:
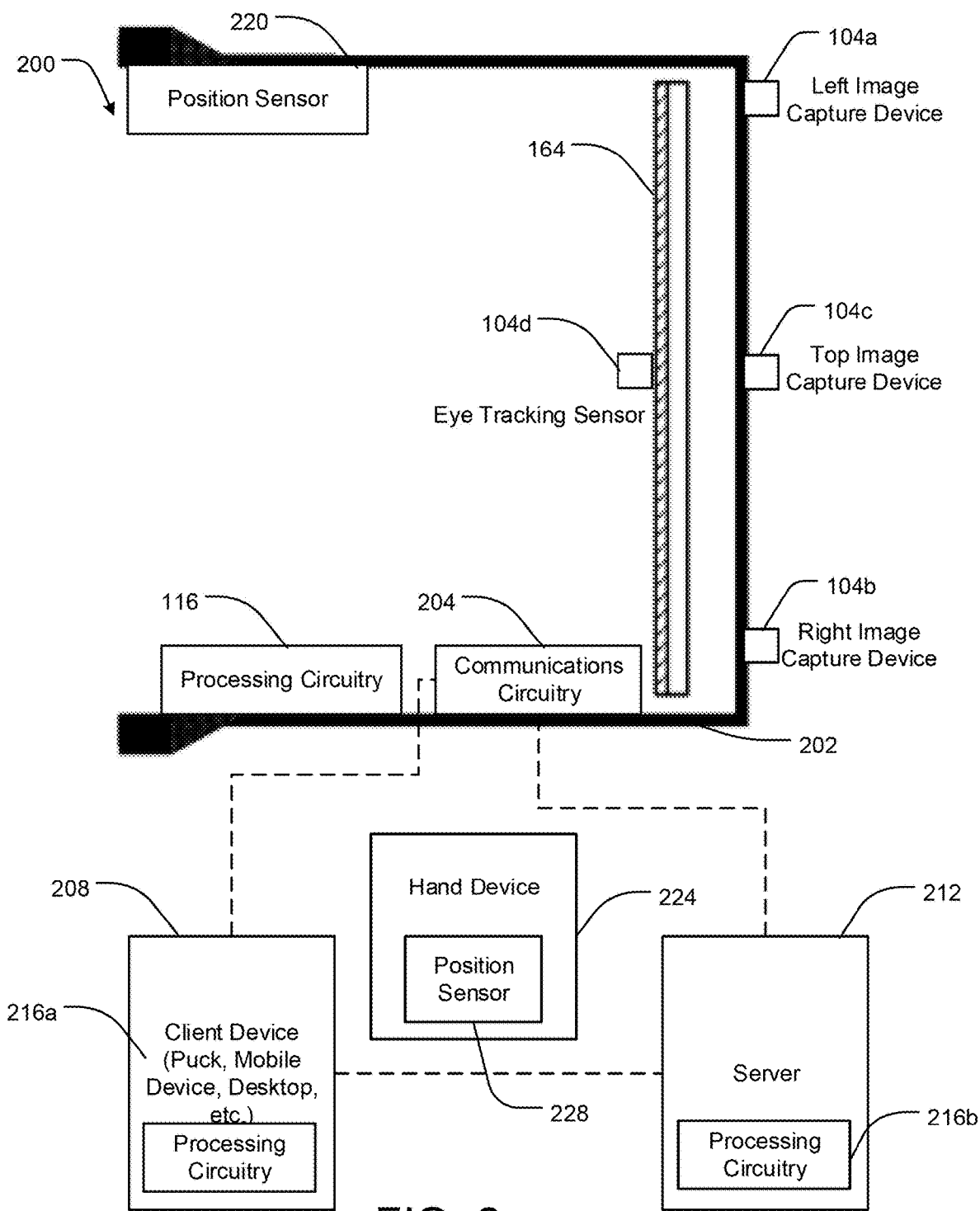
FIG. 2 is a schematic diagram of a head-mounted display (HMD) system according to an implementation of the present disclosure.

The sensors 104 can include eye tracking sensors 104 or head tracking sensors 104 that can provide information such as positions, orientations, or gaze directions of the eyes or head of the user (e.g., wearer) of an HMD. In some embodiments, the sensors 104 are inside out tracking cameras configured to provide images for head tracking operations. The sensors 104 can be eye tracking sensors 104 that provide eye tracking data, such as data corresponding to at least one of a position or an orientation of one or both eyes of the user. In some embodiments, the sensors 104 optically measure eye motion, such as by emitting light (e.g., infrared light) towards the eyes and detecting reflections of the emitted light. The sensors 104 can be oriented in a direction towards the eyes of the user (e.g., as compared to sensors 104 that capture images of an environment outside of the HMD). For example, the sensors 104 can include at least one fourth sensor 104d (e.g., as illustrated in FIG. 2) which can be oriented towards the eyes of the user to detect sensor data regarding the eyes of the user. In some embodiments, the head tracking sensors 104 generate motion data including at least one of a position, a velocity, or an acceleration of the head (e.g., of the HMD).

The sensors 104 can include hand tracking sensors 104 that can provide information such as positions or orientations of one or more hands of the user. The hand tracking sensors 104 can generate motion data including at least one of a position, a velocity, or an acceleration of a respective hand (e.g., of a hand device 224 manipulated by the hand as described with reference to FIG. 2). The head tracking sensors 104 and hand tracking sensors 104 can include any of a variety of position sensors, such as an inertial measurement unit (IMU), an accelerometer, a gyroscope, a magnetometer (e.g., magnetic compass), or any combination thereof. The sensors 104 can include various body position sensors such as leg sensors or torso sensors.

The sensors 104 can capture images 112 of an environment around the sensors 104. For example, the sensors 104 can capture images 112 of an environment in or around a field of view of the user of the HMD. The images 112 can be representations of the environment, such as color or grayscale array or matrix of pixels representing parameters of light captured from the environment (e.g., color, brightness, intensity). The environment can be an indoor or outdoor environment, including both natural and man-made structures, terrain, or other objects, including sky, clouds, roads, buildings, streets, pedestrians, or cyclists. The environment can include one or more objects (e.g., real-world objects), which can be represented by the images 112 captured by the sensors.

The processing circuitry 116 can include a motion detector 120. The motion detector 120 can include any function, operation, routine, logic, or instructions to perform functions such as detecting and monitoring movement of the head or hands of the user based on sensor data received from sensors 104. For example, the motion detector 120 can receive sensor data including at least one of a velocity or an acceleration (of the head or of one or more hands), and generate motion data based on the received sensor data. The motion detector 120 can generate motion data that includes at least one of a position or an orientation responsive to the sensor data. In some embodiments, the sensors 104 can at least partially implement the motion detector 120, such as to generate the motion data using processing hardware of the sensors 104 and provide the motion data to the processing circuitry 116.

The motion detector 120 can generate the motion data in a particular frame of reference. For example, the motion detector 120 can retrieve orientation data from the sensor data received from the sensors 104, and use the orientation data to transform the sensor data to a frame of reference used by simulation generator 152 to generate the virtual environment based on which image renderer 160 generates display images. The motion detector 120 can transform the sensor data to a frame of reference corresponding to at least one of the position or the orientation of the HMD, as the HMD may represent a baseline frame of reference corresponding to how the user perceives the simulated environment while using the HMD.

In some embodiments, the motion detector 120 includes a hand tracker 124. The hand tracker 124 can receive sensor data regarding one or more hands of the user from one or more corresponding hand tracking sensors 104, and generate motion data including at least one of a position, a velocity, or an acceleration of the one or more hands based on the received sensor data. For example, the hand tracker 124 can receive the sensor data from the hand tracking sensor 104 that is coupled with the hand device 224 to determine motion data indicative of motion of the hand device 224 (and thus the hand of the user). The hand tracker 124 can maintain a log of position, orientation, velocity, or acceleration data (or combinations thereof) to track the one or more hands of the user. The hand tracker 124 includes accelerometers, positons sensors, and/or velocity sensors in some embodiments.

In some embodiments, the motion detector 120 includes a head tracker 128. The head tracker 128 can receive sensor data regarding the head of the user from one or more corresponding head tracking sensors 104, and generate motion data including at least one of a position, a velocity, or an acceleration of the head based on the received sensor data. For example, the head tracker 128 can receive the sensor data from the head tracking sensor 104 that is coupled with the HMD to determine motion data indicative of motion of the HMD (and thus the head of the user). The head tracker 128 can maintain a log of position, orientation, velocity, or acceleration data (or combinations thereof) to track the head of the user. The head tracker 128 includes accelerometers, positons sensors, and/or velocity sensors in some embodiments.

The processing circuitry 116 can include a collision detector 132. The collision detector 132 can include any function, operation, routine, logic, or instructions to perform functions such as to determine distances to collision, times to collision, or likelihoods of collision of the user and one or more obstacles in the real world environment around the user. The collision detector 132 can use the motion data generated by the motion detector 120, along with information regarding obstacles provided by obstacle tracker 140, to determine information regarding potential collisions between the user and one or more obstacles. The collision detector 132 can generate an indication of a potential collision that includes parameters such as a distance to collision, a time to collision, or a likelihood of collision.

To determine the distance to collision, the collision detector 132 can determine, based on the motion data received from the motion detector 120, a position of the user, and compare the position of the user to the position of the one or more obstacles. The position of the user can include at least one of a position of the head of the user, a position of one or more hands of the user, or an interpolated position regarding the body of the user, which the collision detector 132 can determine by combining positions of the head and the hand(s), such as by retrieving a model of a body shape and registering the positions of the head and the hand(s) to the model. The collision detector 132 can determine the distance to collision by comparing the position of the user to the position of the one or more obstacles by subtracting the positions.

In some embodiments, the collision detector 132 determines the position of the head by applying a minimum radius to the position of the head. This can facilitate defining the edge of the playspace (e.g., the virtual environment) up against the one or more obstacles, and avoid a situation in which the user's body contacts the one or more obstacles before the collision detector 132 determines the distance to collision to decrease to zero. In some embodiments, the minimum radius is greater than or equal to ten centimeters and less than or equal to fifty centimeters. In some embodiments, the minimum radius is greater than or equal to twenty centimeters and less than or equal to forty centimeters. In some embodiments, the minimum radius is greater than or equal to twenty five centimeters and less than or equal to thirty five centimeters. The minimum radius can be on an order of size similar to a width of the human body or a size of the HMD.

The collision detector 132 can determine the position of the one or hands by applying a minimum radius to the position of the one or more hands, which can similarly reduce the likelihood that the user's hands contact the one or more obstacles before the collision detector 132 determines the distance to collision to decrease to zero. The minimum radius applied to the position of the one or more hands can be less than that applied to the position of head.

In some embodiments, the collision detector 132 limits the position of the one or more hands based on the position of the head and a predetermined characteristic regarding reach of the one or more hands. For example, the collision detector 132 can compare a difference between the position of the one or more hands and the position of the head to an expected maximum distance, and modify the position of the one or more hands based on the expected maximum distance responsive to the difference being greater than the expected maximum distance (e.g., by determining an orientation vector of the one or more hands relative to the position of the head, and reducing the distance from the position of the one or more hands to the position of the head along the orientation vector to be no greater than the expected maximum distance). In some embodiments, the expected maximum distance corresponds to a model of the human body, such as a value indicative of a 95th percentile or 99th percentile extent of human reach. In some embodiments, the expected maximum distance is one meter.

The collision detector 132 can determine the maximum distance based on a user profile regarding the user. For example, the user profile may include user profile data regarding the user such as height, reach, or target warning display rates. The processing circuitry 116 can request the user profile data via a user interface of the HMD or VR system (e.g., via an application operated by the processing circuitry 116). The processing circuitry 116 monitor usage of the HMD or VR system to detect the user profile data, such as by using position sensors 104 or the motion detector 120 to detect range of movement of the user. In some embodiments, the processing circuitry 116 requests or detects the user profile data responsive to an initialization process of the HMD or VR system (or one or more applications operated by the HMD or VR system), such as by providing instructions via the HMD or VR system requesting the user to perform movements such as reaching movements.

The collision detector 132 can use the distance to collision and at least one of velocity data or acceleration data of the motion data to determine the time to collision. For example, the collision detector 132 can divide the distance to collision by velocity to determine the time to collision.

In some embodiments, the collision detector 132 smoothes the motion data over a predetermined duration of time. By smoothing the motion data (e.g., smoothing velocity or acceleration data), the collision detector 132 can reduce the likelihood of triggering false positive warnings by the warning generator 148, which might otherwise result from short, rapid, or impulse-like movements, such as fast flicks of the hand device 224. The collision detector 132 can determine an average value of the motion data over the predetermined duration of time, and can use the average value to determine the time to collision. In some embodiments, the predetermined duration of time is less than one second. In some embodiments, the predetermined duration of time is greater than or equal to 0.05 seconds and less than or equal to 0.50 seconds. In some embodiments, the predetermined duration of time is greater than or equal to 0.1 seconds and less than or equal to 0.3 seconds. In some embodiments, the predetermined duration of time is 0.15 seconds. The collision detector 132 can smooth the motion data by sampling motion data over the predetermined duration of time backwards from a current time at which the collision detector 132 processes the motion data (e.g., sampling the previous 0.15 seconds of motion data). In some instances, smoothing the motion data may introduce latency; however, the latency effects can be mitigated or offset by increasing estimation time (e.g., time over which collision detection or warning generation occurs or rate at which collision detection occurs).

The collision detector 132 can determine the likelihood of collision using parameters such as the distance to collision, the time of collision, and the motion data. For example, the collision detector 132 can generate a relatively greater (or lesser) likelihood of collision as the distance to collision or time of collision decreases (or increases). The collision detector 132 can generate a relatively greater (or lesser) likelihood of collision depending on a direction of the velocity or acceleration; for example, if the velocity indicates that the user is moving towards (or away) from the one or more obstacles, or the acceleration indicates a rate of movement towards the one or more obstacles is increasing (or decreasing), then the likelihood of collision can be relatively greater (or lesser).

In some embodiments, the collision detector 132 provides the velocity data as the collision data. For example, as described further herein, the warning generator 148 can compare the velocity data to a velocity threshold, and generate a warning responsive to the velocity data exceeding the velocity threshold.

The processing circuitry 116 can include an object detector 136. The object detector 136 can include any function, operation, routine, logic, or instructions to perform functions such as detecting obstacles and positions or movement thereof in the real world environment. The object detector 136 can receive the images 112 from the sensors 104. The object detector 136 can process the images 112 or portions thereof to detect one or more objects represented by the images 112. For example, the object detector 136 can detect or identify objects represented by the images 112 by processing elements of the images 112 such as pixels or groups of pixels, such as by processing pixels or groups of pixels indicating colors, shapes, edges, contrast between pixels or groups of pixels, and spatial relationships between pixels. The object detector 136 can detect objects by executing spatial filters, segmentation, or machine learning models trained to detect objects. The object detector 136 can identify candidate objects from the image 112, such as groups of pixels representing edges, compare the candidate objects to one or more template objects (e.g., template objects or features thereof in an object database), and identify the objects of the image 112 based on candidate objects that match template objects. The object detector 136 can apply various objection recognition algorithms or models to identify the objects. The objects can be real-world or simulated objects.

In some embodiments, the object detector 136 does not specifically identify a type, class, or other identifier of the object in the image 112. The object detector 136 can receive an indication from the sensors 104 that the object has been detected by the sensors 104. For example, the object detector 136 can receive an indication that a particular image 112 represents an object (in which case the object detector 136 can process the image 112 to identify one or more pixels corresponding to the object). In some embodiments, the indication can include one or more pixels corresponding to the object.

In some embodiments, the object detector 136 detects the object using an object database that can include location data of various objects, buildings, structures, roads, or other indoor and outdoor features. For example, the object detector 136 can communicate with an object database mapping objects or features of objects to position data. The object database may also maintain semantic or textual information regarding objects, such as information regarding type, class, shape, color, size, or other features regarding the objects. The object detector 136 can receive data regarding the position of the HMD or VR system (e.g., from position sensor 220 described with reference to FIG. 2), and use the data to retrieve one or more candidate objects from the object database. The object detector 136 can compare the sensor data to the one or more candidate objects and information maintained by the object database regarding the one or more candidate objects to identify the object (e.g., by matching the sensor data to the information received from the object database). In some embodiments, the object database includes data from the database of obstacles described with reference to obstacle tracker 140, and the object detector 136 can use the detected objects to update the locations of obstacles in the database of obstacles.

The object detector 136 can determine a position of the object using information received from the sensors 104, such as the image 112 or the indication that the image 112 represents an object. For example, the object detector 136 can identify one or more pixels corresponding to the object. In some embodiments, the object detector 136 determines the position of the object as a position in an image space of the image 112, such as by assigning one or more pixels corresponding to the object as the position of the object. In some embodiments, the object detector 136 determines the position of the object as a position in three-dimensional space (e.g., real world space, AR or VR space, space in the environment around the HMD or VR system), such as by using depth information to determine the position of the object.

The processing circuitry 116 can include an obstacle tracker 140. The obstacles tracker 140 can include any function, operation, routine, logic, or instructions to perform functions such as tracking the positions and motion of the one or more obstacles. In some embodiments, the obstacle tracker 140 maintains a database of obstacles and locations associated with the obstacles. In some embodiments, the obstacle tracker 140 receives obstacle position data from the object detector 136.

In some embodiments, the obstacle tracker 140 maintains a database regarding obstacles in the play space. The database can be generated based on user input indicating obstacle locations, such as user input provided via manipulation of the hand device 224 (e.g., drawing of walls, doors, floors, ceilings, or objects in the play space).

The obstacle tracker 140 can include a depth mapper 144. The depth mapper 144 can include any function, operation, routine, logic, or instructions to perform functions such as generating depth information regarding the one or more obstacles tracked by the obstacle tracker 140. The depth mapper 144 can receive the images 112 from the sensors 104, and use the images 112 to generate depth information regarding one or more obstacles in the environment, such as depth maps (e.g., depth buffers). The depth mapper 144 can generate the depth information based on information regarding the image capture devices 104a . . . n used to capture the images 112a . . . k. For example, the depth mapper 144 can the depth map based on a baseline distance between the first lens 108a via which the first image 112a was captured and the second lens 108b via which the second image 112b was captured, and a focal length of the first lens 108a. The depth mapper 144 can generate a first depth map by assigning a depth value to at least one corresponding pixel of the first image 112a, and a second depth map by assigning a depth value to at least one corresponding pixel of the second image 112b. For example, the depth mapper 144 can generate the first depth map as a matrix of pixels corresponding to the pixels of the first image 112a, each first depth buffer pixel having an assigned depth value. The depth mapper 144 can generate the depth map to have a lesser resolution than the images 112a . . . k.

The processing circuitry 116 can include a warning generator 148. The warning generator 148 can include any function, operation, routine, logic, or instructions to perform functions such as generating a warning regarding a potential collision with the one or more obstacles in response to the motion data and the collision data received from the collision detector 132. For example, the warning generator 148 can selectively generate icons, labels, or representations of the one or more obstacles to warn the user of the HMD of the potential collision. For example, the warning generator 148 can generate display data indicating gridded elements representing the one or more obstacles (e.g., gridded walls). The warning generator 148 can generate the warning to correspond to a real-world position of the one or more obstacles relative to a direction of movement of the user.

The warning generator 148 can generate the warning by evaluating various combinations of factors. For example, the warning generator 148 can generate no warning when the user is far from the obstacles even if the motion data indicates that the user is moving relatively quickly; generate at least a minimal warning when the user is close to the obstacles even if the motion data indicates that the user is not moving.

In some embodiments, the warning generator 148 determines one or more parameters of the warning (e.g., a parameter of how the warning is to be displayed) based on the collision data. For example, the warning generator 148 can apply a warning policy based on various filters, functions, thresholds, or other processes to the collision data to determine if and how to display the warning. The one or more parameters can include magnitude (e.g., brightness, intensity), position, contrast, color, frequency, or intermittency. For example, the warning generator 148 can apply a function to the time to collision received from the collision detector 132 to determine an intensity of the warning based on the time to collision, such as a function that increases the intensity as the time to collision decreases.

In some embodiments, the warning generator 148 uses thresholds regarding the collision data to determine when and how to trigger and generate warnings based on the collision data. For example, the warning generator 148 can compare the distance to collision to a threshold distance, and generate the warning responsive to the distance being less than the threshold distance. The warning generator 148 can compare the time to collision to a threshold time, and generate the warning responsive to the time to collision being less than the threshold time. The warning generator 148 can compare the likelihood of collision to a threshold likelihood of collision, and generate the warning responsive to the likelihood of collision being greater than the threshold likelihood of collision. The thresholds can be predetermined, user-defined, or adjusted responsive to various scaling factors described herein.

In some embodiments, the warning generator 148 assigns a greater weight to motion data regarding the head of the user than motion data regarding the one or more hands of the user. For example, the warning generator 148 can assign a first weight to motion data regarding the head of the user that is greater than a second weight assigned to motion data regarding the one or more hands of the user. The greater weight for the motion data regarding the head of the user can help balance maintaining immersion while providing appropriate warnings, as the head and hands may typically move at different weights, and the position of the head may more consistently represent the position of the user. The weights can be applied to increase the collision data (e.g., likelihood of collision) where the collision data is compared to a minimum threshold (e.g., minimum threshold above which the warning is to be generated), or to decrease the collision data (e.g., time to collision, distance to collision) where the collision data is compared to a maximum threshold (e.g., maximum threshold below which the warning is to be generated). The weights can be applied to adjust respective thresholds. The weights can be assigned to make the warning generator 148 less sensitive to motion of the one or more hands than motion of the head.

In some embodiments, the warning generator 148 applies different thresholds when evaluating the distance to collision regarding the head as compared to the distance to collision regarding the one or more hands. For example, the warning generator 148 may use a threshold that is lower for the distance to collision of the one or more hands than of the head, such that the one or more hands should be closer to the one or more obstacles than the head to trigger the warning.

In some embodiments, the warning generator 148 uses a minimum activation distance to trigger the warning based on movement regarding the head (e.g., regardless of velocity of the head). For example, the warning generator 148 can determine a distance that the head moves (e.g., during a previous period of time, such as the previous one second, two seconds, or three seconds), compare the distance to the minimum activation distance, and not generate the warning unless the distance exceeds the minimum activation distance. This can be useful for instances in which a user may make sudden but short movements. In some embodiments, the minimum activation distance is greater in a direction behind the HMD than in front of the user, which can account for factors such as the head of the user slouching forward (such that the point at which the position of the head is detected is closer to the front of the head of the user than the back of the head of the user).

The warning generator 148 can generate a minimum warning indicator independent of the thresholds, or responsive to at least one threshold being satisfied. For example, if the motion detector 120 provides motion data indicating that the user is not moving, the warning generator 148 can provide a minimum indicator (e.g., around the HMD or hand device 224). This can enable the warning generator 148 to avoid loss of immersion while maintaining the warning.

The warning generator 148 can scale the collision data or the one or more parameters based on various scaling factors. For example, the warning generator 148 can use scaling factors such as a size metric of the play space or the environment, a motion metric regarding one or more prior movements performed by the user, the application being used by the simulation generator 152 to generate the virtual environment, or a user model or user profile.

For example, the warning generator 148 can determine a size metric of the play space (e.g., the real world environment, such as the room, in which the user is operating the HMD). The warning generator 148 can determine the size metric based on boundaries maintained by the obstacle tracker 140 regarding the one or more obstacles, including obstacles such as walls, floors, and ceilings. The warning generator 148 can decrease the effect of velocity or acceleration data as the size metric decreases (e.g., in smaller spaces the user may be more aware of their surroundings) and increase the effect of velocity or acceleration data as the size metric increases (e.g., in larger spaces the user may be less aware of their surroundings and may make larger motions). For example, the warning generator 148 can assign a greater weight to velocity or acceleration data as the size metric increases.

The warning generator 148 can determine a motion metric regarding recent motion performed by the user. For example the warning generator 148 can monitor velocity data during a previous period of time (e.g., previous one second, previous two seconds, previous three seconds), and compare the velocity data to a velocity threshold. Responsive to an instantaneous or smoothed value of the velocity data exceeding the velocity threshold, the warning generator 148 can determine that the user is performing relatively large movements, and increase the sensitivity of the warning generator 148 for generating warnings (e.g., decrease threshold(s) used to evaluate velocity data). For example, if the warning generator 148 detects large increases in velocity during the previous period of time, the warning generator 148 decrease a velocity threshold used to evaluate the velocity data, or distance thresholds or time to collision thresholds used to evaluate distance to collision or time to collision data. In some embodiments, the warning generator 148 assigns a greater weight to motion data regarding the head than motion data regarding the one or more hands when determining the motion metric.

The warning generator 148 can adjust the thresholds used to evaluate the collision data based on an application being operated to generate the virtual environment. For example, the application may indicate application data regarding expected movements to be performed in use of the application. The application data may be based on historical data regarding use of the application by any number of users; for example, the simulation generator 152 can use the motion detector 120 to monitor motion data during usage of the application and maintain a log of the motion data, which can be used to determine statistical measures of the motion data (e.g., average velocity, median velocity, standard deviations of velocity, or similar measures for acceleration).

In some embodiments, the application data indicates an average velocity of expected movements. The warning generator 148 can determine the thresholds used to evaluate the collision data based on the average velocity, such as by applying a scaling factor to the average velocity (e.g., set the threshold to two times the average velocity), or configuring the thresholds so that the warning is triggered when a time to collision based on the average velocity and an actual distance to the one or more obstacles is less than a threshold time (e.g., if the user moving at the average velocity from a current position for two seconds would contact the one or more obstacles, then trigger the warning).

In some embodiments, the application data indicates a velocity ranking for the application. For example, the warning generator 148 may use a plurality of velocity rankings that the warning generator 148 can map to expected average velocity or to particular thresholds. The velocity ranking may be user defined; for example, a developer of the application can assign the velocity ranking to the application.

The warning generator 148 can maintain a user model regarding triggering warnings for a particular user of the HMD. The warning generator 148 can identify a user identifier of the user (e.g., based on various activation, initialization, or login procedures performed by the user), and map the user model to the user identifier. The user model can enable the warning generator 148 to customize the triggering of warnings for the identified user. For example, the warning generator 148 can use the user model to customize the warnings based on factors such as the application being operated, including the application data described above, as well as an indication of a frequency or a magnitude of warnings that are triggered by movement of the identified user, which can enable the warning generator 148 to maintain a balance between immersion and warning.

The processing circuitry 116 can operate a user model to determine how to generate warnings. The user model can include any of various unsupervised or supervised machine learning models, which can be trained to output factors associated with warning generation such as thresholds associated with triggering warnings and parameters of the warnings. For example, the user model can include an unsupervised machine learning model that is trained using the collision data to segment or cluster the collision data (e.g., along with detected collision events) to identify thresholds for triggering warnings. The user model can be trained using data regarding the user as well as other users. The user model can include a supervised machine learning model that is trained using the collision data to generate the thresholds based on the collision data and an indication of when collisions occur, an indication of when users deactivate the warning system (which may be indicative of loss of immersion), or a target performance characteristic, such as a ratio of displayed images that include warnings (e.g., include display data regarding the warnings of more than a threshold number of pixels or intensity of pixels) to displayed images that do not include warnings. In some embodiments, the warning generator 148 maintains a data structure that indicates at least one of the application being operated, the motion data detect during operation of the application, the time stamps at which the warning generator 148 triggers warnings, the collision data corresponding to the time stamps at which the warning generator 148 triggers warnings, or the thresholds used to trigger the warnings. The warning generator 148 can provide entries of the data structure as input to the user model to train the user model. For example, the warning generator 148 can cause the user model to cluster the input of the data structures based on particular thresholds in order to achieve a target balance between immersion and warning (e.g., achieve a particular frequency of warning based on displayed images in which the warning is present compared to total displayed images).

In some embodiments, the warning generator 148 selectively generates the warning in an image space of the HMD. For example, the warning generator 148 can generate the warning so that the warning is more noticeable in a periphery of displays 164 or a periphery of the field of view (FOV) of displays 164, or so that the warning is focused on the portion(s) of the one or more obstacles that trigger the warning generator 148 to generate the warning. For example, the warning generator 148 can identify the periphery to correspond to edges (or edge portions) of the images displayed using the displays 164. The periphery can correspond to a number of pixels from the edges or a fraction of pixels from the edges to the center of the images displayed using the displays 164. The periphery can include horizontal edges, vertical edges, or any combination thereof, including particular edges portions where the displays 164 have curved or curvilinear edges. As such, the warning generator 148 can limit a degree to which the warning detracts from immersion, highlight the one or more obstacles that trigger the warning, and enable the warning to have directionality.

The warning generator 148 can determine the FOV of the HMD in any of a variety of ways. For example, the warning generator 148 can query the HMD for data regarding the FOV. The warning generator 148 can identify at least one of resolution of images displayed by the HMD (e.g., based on operation of the image renderer 160) or a size of displays 164 to determine the FOV.

In some embodiments, the warning generator 148 processes the collision data received from the collision detector 132 to determine an extent of the one or more obstacles in the FOV. For example, the warning generator 148 can evaluate the collision data on a more granular basis than determining whether to generate a warning on a single obstacle basis, such as by evaluating the collision data on a pixel-by-pixel or groups of pixel basis. For example, the warning generator 148 can identify multiple subsets of one or more pixels that correspond to a selected obstacle of the one or more obstacles. The warning generator 148 can identify collision data corresponding to each subset of one or more pixels, and evaluate each subset to determine whether the collision data corresponding to the subset indicates a warning should be generated (e.g., for a particular subset of pixels, determine whether the subset of pixels satisfies the corresponding thresholds). Responsive to determining to generate a warning for the subset, the warning generator 148 can assign the subset of pixels as the extent of the obstacle.

In some embodiments, the warning generator 148 uses a distance between the position of the user (e.g., as determined by motion detector 120) and the position of the obstacle to determine an angular range corresponding to the obstacle, such that as the distance decreases, the angle increases. For example, the warning generator 148 can determine an angular range corresponding to an angular size of an appearance of the obstacle within the FOV of the user. The warning generator 148 can assign a weight to each pixel representing the obstacle based on the distance between the position of the user and the position of the obstacle (e.g., greater weight as the distance decreases).

The warning generator 148 can always show the warning (e.g., when the warning is determined to be triggered) within the FOV, which can ensure that the warning is presented to the user regarding obstacles that the user may be approaching backwards or sideways. For example, responsive to determining to trigger the warning, the warning generator 148 can compare a direction of the user (e.g., based on sensor data received from sensors 104 or motion data received from motion detector 120) to a direction towards the obstacle that triggered the warning. Responsive to an angle between the direction of movement and the direction towards the obstacle being greater than an extent of the FOV (e.g., an angle from a center of the FOV to an edge of the FOV), the warning generator 148 can determine to present the warning on an edge of the FOV. For example, if the user is facing forwards or moving forwards but there is an obstacle to the left and behind the user, the angle between the direction of the user and the direction towards the obstacle may be greater than the extent of the FOV, such as the angle from the direction of the user to the left edge of the FOV being between 70 and 85 degrees, while the angle from the direction of the user to the direction towards the obstacle is between 150 and 175 degrees (measured counter-clockwise from the direction of the user or the center of the FOV). The warning generator 148 can determine to present warning regarding the obstacle behind the user along the left edge of the FOV. In some embodiments, the warning is an audio warning or a haptic warning such as a vibration on the hand device 224 if the hand holding that device is about to collide with an object or a vibration on the HMD if the head is about to strike an object.

The warning generator 148 can provide instructions to the image renderer 160 with the warning to cause the image renderer 160 to apply various display effects for displaying the warning at the periphery of the FOV to facilitate user awareness of the warning. For example, the image renderer 160 can increase at least one of an intensity or a contrast associated with the warning at the periphery of the FOV, such as to cause the warning to having a glow appearance.

In some embodiments, the warning generator 148 uses depth map data from the depth mapper 144 to generate the warning to include a representation of the one or more obstacles. For example, the warning generator 148 can use the depth map data to monitor positions of the one or more obstacles, including objects that may be moving in the real world environment. The warning generator 148 can periodically sample the depth map data to use the depth map data as distance to collision data as the relative distances between the user and the one or more obstacles change, and evaluate the depth map data to determine whether to generate the warning (as well as to determine the parameters of the warning).

In some embodiments, the warning generator 148 (or the image renderer 160) uses the depth map data to generate display data regarding the one or more obstacles. For example, the warning generator 148 can use the depth map data to determine the pixels to use to display the one or more obstacles. In some embodiments, the warning generator 148 generates the display data regarding the one or more obstacles in a manner different than used to display the virtual environment, to help distinguish the real world obstacles from objects in the virtual environment. The warning generator 148 can apply peripheral scaling factors as described herein (e.g., relatively higher intensity at the periphery of the FOV of the HMD) to the display data regarding the one or more obstacles generated using depth map data.

The processing circuitry 116 can include a simulation generator 152. The simulation generator 152 can include any function, operation, routine, logic, or instructions to perform functions such as operating an application, such as a game, trainer, or simulator, receive user input data, update the operation of the application based on the user input data, and provide display data to the image renderer 160 to enable the image renderer 160 to render display images for displaying the virtual environment. The simulation generator 152 can receive sensor data from the sensors 104 or motion data from the motion detector 120, such as data regarding movement of the head or hands of the user, process the sensor data or motion data to identify the user input data, and update the operation of the application based on the identified user input data. For example, the simulation generator 152 can use the motion detector 120 to detect a movement of a hand of the user, such as a swing, push, or pull, and use the movement as a user input for the application.

The simulation generator 152 can generate depth buffer information corresponding to the display data, enabling the image renderer 160 to render 3D image data. The simulation generator 152 can receive depth map data from the depth mapper 144 regarding the one or more obstacles to operate the application or generate the display data using the depth map data.

The processing circuitry 116 can include an image renderer 160. The image renderer 160 can be a 3D image renderer. The image renderer 160 may use image related input data to process, generate and render display or presentation images to display or present on one or more display devices, such as via an HMD. The image renderer 160 can generate or create 2D images of a scene or view for display on display 164 and representing the scene or view in a 3D manner. The image renderer 160 can generate images for display on display 164 based on display data received from the simulation generator 152 (e.g., depth buffers received from the simulation generator 152) as well as the warning generator 148 (e.g., display data indicating where and how to display warnings). The display or presentation data to be rendered can include geometric models of 3D objects in the scene or view. The image renderer 160 may determine, compute or calculate the pixel values of the display or image data to be rendered to provide the desired or predetermined 3D image(s), such as 3D display data for the images 112 captured by the sensor 104.

The image renderer 160 can render frames of display data to one or more displays 164 based on temporal and/or spatial parameters. The image renderer 160 can render frames of image data sequentially in time, such as corresponding to times at which images are captured by the sensors 104 or at which frames of display data are received from simulation generator 152. The image renderer 160 can render frames of display data based on changes in position and/or orientation, such as the position and orientation of the HMD as indicated by sensors 104. The image renderer 160 can render frames of display data based on left-eye view(s) and right-eye view(s) such as displaying a left-eye view followed by a right-eye view or vice-versa.

The image renderer 160 can generate the display images using motion data regarding movement of the sensors 104. For example, the sensors 104 may change in at least one of position or orientation due to movement of a head of the user wearing an HMD that includes the sensors 104 (e.g., as described with reference to HMD system 200 of FIG. 2). The processing circuitry 116 can receive the sensor data from a position sensor (e.g., position sensor 220 described with reference to FIG. 2).

Although the image renderer 160 is shown as part of the processing circuitry 116, the image renderer may be formed as part of other processing circuity of a separate device or component, such as the display device, for example within the HMD.

The system 100 can include one or more displays 164. The one or more displays 164 can be any type and form of electronic visual display. The displays may have or be selected with a predetermined resolution and refresh rate and size. The one or more displays can be of any type of technology such as LCD, LED, ELED or OLED based displays. The form factor of the one or more displays may be such to fit within the HMD as glasses or goggles in which the display(s) are the leans within the frame of the glasses or goggles. The displays 164 may have a refresh rate the same or different than a rate of refresh or frame rate of the processing circuitry 116 or the image renderer 160, the simulation generator 152, or the sensors 104.

Referring now to FIG. 2, in some implementations, an HMD system 200 can be used to implement the system 100. The HMD system 200 can include an HMD body 202, a left sensor 104a (e.g., left image capture device), a right sensor 104b (e.g., right image capture device), and the display 164. The HMD body 202 can have various form factors, such as glasses or a headset. The sensors 104a, 104b can be mounted to or integrated in the HMD body 202. The left sensor 104a can capture first images corresponding to a first view (e.g., left eye view), and the right sensor 104b can capture images corresponding to a second view (e.g., right eye view). In some embodiments, the HMD system 200 does not include image capture devices. The HMD system 200 can be used to implement VR functionality, such as to present a virtual environment via the display 164.

The HMD system 200 can include a top sensor 104c (e.g., top image capture device). The top sensor 104c can capture images corresponding to a third view different than the first view or the second view. For example, the top sensor 104c can be positioned between the left sensor 104a and right sensor 104b and above a baseline between the left sensor 104a and right sensor 104b. This can enable the top sensor 104c to capture images with depth information that may not be readily available to be extracted from the images captured by the left and right sensors 104a, 104b. For example, it may be difficult for depth information to be effectively extracted from images captured by the left and right sensors 104a, 104b in which edges (e.g., an edge of a table) are parallel to a baseline between the left and right sensors 104a, 104b. The top sensor 104c, being spaced from the baseline, can capture the third image to have a different perspective, and thus enable different depth information to be extracted from the third image, than the left and right sensors 104a, 104b.

The HMD system 200 can include processing circuitry 116, which can perform at least some of the functions described with reference to FIG. 1, including receiving sensor data from position sensors 104 (e.g., head tracking sensors) to detection movement of the HMD and generate warnings regarding potential collisions with obstacles based on the movement of the HMD.

The HMD system 200 can include communications circuitry 204. The communications circuitry 204 can be used to transmit electronic communication signals to and receive electronic communication signals from at least one of a client device 208 or a server 212. The communications circuitry 204 can include wired or wireless interfaces (e.g., jacks, antennas, transmitters, receivers, transceivers, wire terminals) for conducting data communications with various systems, devices, or networks. For example, the communications circuitry 204 can include an Ethernet card and port for sending and receiving data via an Ethernet-based communications network. The communications circuitry 204 can communicate via local area networks (e.g., a building LAN), wide area networks (e.g., the Internet, a cellular network), and/or conduct direct communications (e.g., NFC, Bluetooth). The communications circuitry 204 can conduct wired and/or wireless communications. For example, the communications circuitry 204 can include one or more wireless transceivers (e.g., a Wi-Fi transceiver, a Bluetooth transceiver, a NFC transceiver, a cellular transceiver). For example, the communications circuitry 204 can establish wired or wireless connections with the at least one of the client device 208 or the server 212. The communications circuitry 204 can establish a USB connection with the client device 208.

The HMD system 200 can be deployed using different architectures. In some embodiments, the HMD (e.g., HMD body 202 and components attached to the HMD body 202) comprises the processing circuitry 116 and is self-contained portable unit. In some embodiments, the HMD has portions of the processing circuitry 116 that work in cooperation with or in conjunction with any type of portable or mobile computing device or companion device that has the processing circuitry or portions thereof, such as in the form of a staging device, a mobile phone or wearable computing device. In some embodiments, the HMD has portions of the processing circuitry 116 that work in cooperation with or in conjunction with processing circuitry, or portions thereof, of a desktop computing device. In some embodiments, the HMD has portions of the processing circuitry 116 that works in cooperation with or in conjunction with processing circuitry, or portions thereof, of a server computing device, which may be deployed remotely in a data center or cloud computing environment. In any of the above embodiments, the HMD or any computing device working in conjunction with the HMD may communicate with one or more servers in performing any of the functionality and operations described herein.

The client device 208 can be any type and form of general purpose or special purpose computing device in any form factor, such as a mobile or portable device (phone, tablet, laptop, etc.), or a desktop or personal computing (PC) device. In some embodiments, the client device can be a special purpose device, such as in the form of a staging device, which may have the processing circuitry or portions thereof. The special purpose device may be designed to be carried by the user while wearing the HMD, such as by attaching the client device 208 to clothing or the body via any type and form of accessory attachment. The client device 208 may be used to perform any portion of the image and rendering processing pipeline described in connection with FIGS. 1 and 3. The HMD may perform some or other portions of the image and rendering processing pipeline such as generating display images of a virtual environment and rendering the display images to the display 164. The HMD can transmit and receive data with the client device 208 to leverage the client device 208's computing power and resources which may have higher specifications than those of the HMD.

The server 212 can be any type of form of computing device that provides applications, functionality or services to one or more client devices 208 or other devices acting as clients. In some embodiments, the server 212 can be a client device 208. The server 212 can be deployed in a data center or cloud computing environment accessible via one or more networks. The HMD and/or client device 208 can use and leverage the computing power and resources of the server 212. The HMD and/or client device 208 can implement any portion of the image and rendering processing pipeline described in connection with FIGS. 1 and 3. The server 212 can implement any portion of the image and rendering processing pipeline described in connection with FIGS. 1 and 3, and in some cases, any portions of the image and rendering processing pipeline not performed by client device 208 or HMD. The server 212 may be used to update the HMD and/or client device 208 with any updated to the applications, software, executable instructions and/or data on the HMD and/or client device 208.

The system 200 can include a position sensor 220. The position sensor 220 can output at least one of a position or an orientation of the body 202. As the image capture devices 104a, 104b, 104c can be fixed to the body 202 (e.g., at predetermined locations relative to the position sensor 220), the position sensor 220 can output at least one of a position or an orientation of each sensor 104a, 104b, 104c, which can be used for depth mapping of obstacles detected via the image capture devices 104a, 104b, 104c. The position sensor 220 can include at least one of an inertial measurement unit (IMU), an accelerometer, a gyroscope, or a magnetometer (e.g., magnetic compass).

The system 200 can include at least one hand device 224. The hand device 224 can be sized and shaped to be held by one or more hands of a user. The hand device 224 can operate as a user control device; for example, the hand device 224 can include various user interface elements (e.g., buttons, switches, toggles, etc.) that can be manipulated by a user to generate user inputs. For example, the hand device 224 can be used as a controller for interacting with a virtual environment being presented via the display 164 based on operation of an application by the HMD system 200. The hand device 224 can communicate with the communications circuitry 204, client device 208, and/or server 212 using various wired or wireless connections. The hand device 224 can include one or more position sensors 228, which can be similar to the position sensor 220. For example, the position sensor 228 can include at least one of an inertial measurement unit (IMU), an accelerometer, a gyroscope, or a magnetometer (e.g., magnetic compass), which can output sensor data including at least one of a position, a velocity, an acceleration, or an orientation of the hand device 224 in order for processing circuitry 116 to use the sensor data to detect movement of one or more hands of the user to determine whether to generate warnings regarding potential collisions between the one or more hands of the user and obstacles in a real world environment around the HMD 200.

Figure 3:
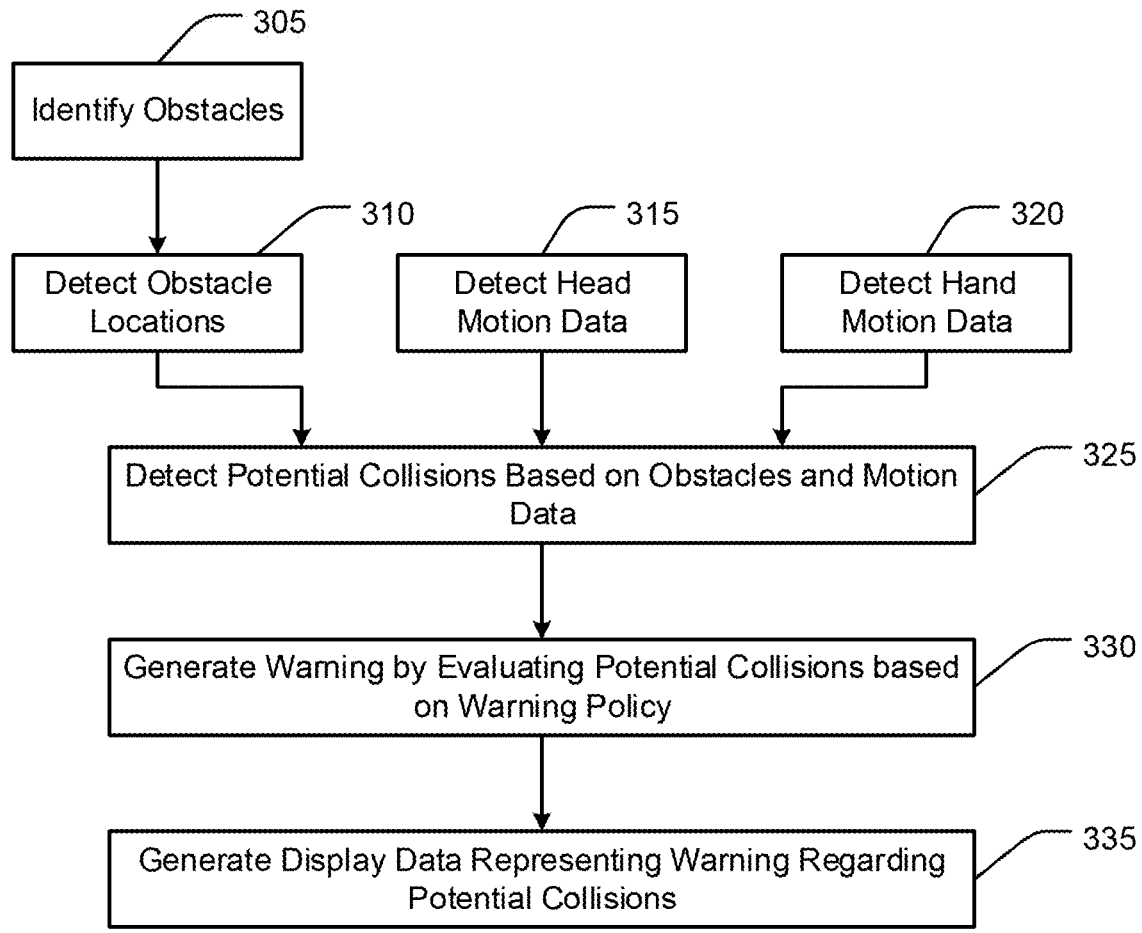
FIG. 3 is a flow diagram of a method for generating dynamic obstacle collision warnings for HMDs according to an implementation of the present disclosure.

Referring now to FIG. 3, a method for generating dynamic obstacle collision warnings is illustrated. In some embodiments, the method 300 can include one or more of the following steps. The method 300 can include identifying one or more obstacles in a real-world environment around an HMD being used to present a virtual environment to a user of the HMD (305). The method 300 can include detecting locations of the one or more obstacles (310). The method 300 can include detecting head motion data regarding a head of the user (315). The method 300 can include detecting hand motion data regarding one or more hands of the user (320). The method can include detecting potential collisions between the user and the one or more obstacles based on the obstacle locations and the motion data (325). The method can include evaluating the potential collisions based on a warning policy to determine if and how to display warnings regarding the potential collisions (330). The method can include generating display data representing the warnings, which can be presented using the HMD (335). The method 300 can be executed using various devices and systems described herein, including the system 100, the processing circuitry 116, and the system 200.

At 305, one or more obstacles in a real-world environment around an HMD are identified. The HMD can be used to implement a VR system, such that a user of the HMD may have their view of the real-world environment at least partially obscured by the HMD while the HMD presents a virtual or simulated environment to the user. In some embodiments, the HMD or VR system maintains a database of obstacles in the real-world environment from which the one or more obstacles can be identified. The database may be populated responsive to user input that indicates the obstacles. In some embodiments, identifying the one or more obstacles includes requesting data regarding the one or more obstacles from the user via the VR system. For example, the VR system can provide instructions to the user requesting the user to operate a hand device (e.g., handheld controller) associated with the HMD to indicate boundaries corresponding to the one or more obstacles. The obstacles can be registered to a frame of reference corresponding to an orientation of the HMD in which the obstacles are identified, such that the obstacles can subsequently be retrieved in the frame of reference and transformed to a different frame of reference as the orientation of the HMD changes.

In some embodiments, the one or more obstacles are identified based on capturing images of the real-world environment. For example, one or more image capture devices associated with the HMD can detect images of the real-world environment. The images can be processed using various object recognition techniques to detect objects corresponding to the one or more obstacles. In some embodiments, the detected objects can be used to update the database of obstacles. Responsive to detecting the obstacles using the images of the real-world environment, depth mapping can be applied to the obstacles to determine distances of the obstacles relative to the HMD (e.g., using left and right eye image capture devices of the HMD, or using an image capture device, such as a 3D camera, separate from the HMD).

At 310, locations of the one or more obstacles are detected. The locations of the one or more obstacles can be detected relative to a position of the user, such as a position that can be determined based on at least one of position data from a position sensor of the HMD or position data from a position sensor of one or more hand devices. The locations of the one or more obstacles can be detected by adjusting locations of the one or more obstacles as maintained in the obstacle database (or as determined via depth mapping) based on at least one of a position or an orientation of the user. For example, the at least one of the position or the orientation of the user can be periodically sampled (e.g., based on sensor data from position sensors of the VR system, thus taking into account movement of the user) and compared to the frame of reference of the locations of the one or more obstacles to determine the locations of obstacles relative to the user.

At 315, head motion data regarding movement of the head of the user is detected. The head motion can be detected by sampling sensor data from one or more head tracking sensors, which may be coupled to the HMD that the user is wearing. The head motion data can be processed to determine at least one of a position, a velocity, an acceleration, or an orientation (e.g., direction) of the head or movement of the head of the user. In some embodiments, a buffer may be applied to the head motion data. For example, a buffer indicative of a size of the head or body of the user may be applied to the position of the head, so that the collision detection and warning generated processes performed responsive to the position of the head can account for the size of the head or body.

At 320, hand motion data regarding movement of one or more hands of the user is detected. The hand motion data can be detected by sampling sensor data from one or more hand tracking sensors, which may be coupled to the hand device that the user is manipulating. The hand motion data can be processed to determine at least one of a position, a velocity, an acceleration, or an orientation (e.g., direction) of the one or more hands or movement of the one or more hands of the user. In some embodiments, a buffer may be applied to the hand motion data. For example, a buffer indicative of a size of the one or more hands of the user may be applied to the position of the one or more hands, so that the collision detection and warning generated processes performed responsive to the position of the one or more hands can account for the size of the one or more hands. In some embodiments, the position of the one or more hands may be modified to be less than a threshold distance from the position of the head. For example, a scaling factor based on an expected reach of the user (e.g., 95th percentile or 99th percentile of reach) may be applied to the position of the one or more hands. The hand motion data may be detected at a sample rate equal to or different than a sample rate of detecting the head motion data.

At 325, potential collisions between the user and the one or more obstacles in the real-world environment can be detected. The potential collisions can be detected based on the motion data and the locations of the one or more obstacles. The potential collisions can be detected responsive to various trigger conditions, such as on a schedule or periodic basis (e.g., detect potential collisions every 10 milliseconds), or responsive to detecting at least a threshold amount of movement of the user (e.g., moving more than 1 meter; moving at more than 0.5 meters per second). For example, the potential collisions can be detected by comparing positions, directions of movement, or rates of movement (e.g., velocities, accelerations) of the user to the locations of the one or more obstacles.

In some embodiments, hand motion data and head motion data are independently evaluated to detect potential collisions. For example, a potential collision can be detected if the one or more hands are expected to collide with the one or more obstacles even if the head is not expected to collide with the one or more obstacles (or vice versa).

In some embodiments, at least one of a distance to collision, time to collision, or likelihood of collision is determined based on the motion data. The distance to collision can be determined by comparing the position of the user to the locations of the one or more obstacles. The time to collision can be determined by applying the velocity data to the distance to collision. The likelihood of collision can be determined by evaluating factors such as the distance to collision, time to collision, and whether the motion data indicates that the user is moving towards or away from the one or more obstacles.

In some embodiments, the motion data is smoothed prior to determining the potential collisions. For example, a previous set of velocity or acceleration data samples can be monitored. The previous set can include a number of data samples (e.g., 10 data samples) or a number of data samples corresponding to a duration of time (e.g., 0.15 seconds of data samples). The number of data samples used to smooth the motion data can be dynamically adjusted based on factors such as processing demand or a frequency at which warnings are triggered. The motion data can be smoothed by averaging the motion data over the number of data samples, or by decreasing a rate of change between each data sample to be less than a threshold rate of change (e.g., if the velocity at a first point in time is 1 meter per second, and the velocity at a second point in time is 1.5 meters per second, decreasing the rate of change of 0.5 meters per second per second to be less than or equal to a threshold rate of change, such as 0.25 meters per second per second, such that the value used for the data sample at the second point in time is 1.25 meters per second).

At 330, a warning is generated by evaluating the potential collisions based on a warning policy. The collision data can be evaluated responsive to the collision data being generated, or at an evaluation rate less than a frequency of generation of the collision data. The collision data can be evaluated responsive to detecting movement of the user greater than a threshold amount of movement.

The warning can be generated based on applying various filters, functions, or other processes to the collision data to determine if and how to display the warning. The warning can be generated based on comparing the collision data to respective thresholds (e.g., before or after applying filters, functions, or other processes). Parameters of the warning, such as magnitude (e.g., brightness, intensity), position, contrast, color, frequency, or intermittency, can be determined based on the collision data. For example, an intensity of the warning can increase as the time to collision decreases.

In some embodiments, collision data regarding the one or more hands is independently or separately evaluated relative to collision data regarding the head. For example, different weights can be applied to the collision data regarding the one or more hands as compared to collision data regarding the head. In some embodiments, a greater weight is assigned to data regarding the head of the user than data regarding the one or more hands of the user. A minimum activation distance can be used to trigger the warning based on movement of the head.

Warnings may be generated responsive to at least one of collision data regarding the one or more hands or collision data regarding the head satisfying the warning policy. In some embodiments, the warning policy triggers the warning responsive to the collision data regarding the one or more hands and the collision data regarding the head each satisfying respective thresholds or other warning conditions.

In some embodiments, the collision data or the parameters of the warning can be scaled based on factors such as a size metric of the real-world environment in which the HMD is operating, a motion metric regarding recent motions performed, the application being operated to generate the virtual environment, or a model regarding movements of the particular user. The size metric can be determined based on boundaries regarding the one or more obstacles or the real world environment, such as walls, floors and ceilings. The size metric can be dynamically updated as the user moves in the real world environment, such as by using depth map data as the user moves between rooms or other regions of the real world environment. The motion metric can be determined by monitoring motion data over a previous period of time (e.g., previous two seconds), and comparing the motion data to a motion threshold, such as a velocity threshold or acceleration threshold. Responsive to the motion data exceeding the motion threshold, the thresholds used by the warning policy to determine whether to trigger warnings can be decreased, such that warning generation can be more sensitive to the motion data. In some embodiments, the motion metric can be selectively applied to the movement of the head or applied to the movement of the head with greater magnitude, as there may be instances in which the hands move in a rapid manner even if the overall position of the user does not change (e.g., the user's feet do not move more than a few inches or a foot). The application can indicate an expected velocity of movement during use of the application, or a velocity ranking that can be mapped to expected velocity.

The model can use information such as the application being operated, the motion data detect during operation of the application, the time stamps at which the warnings are triggered, the collision data corresponding to the time stamps at which the warnings are triggered, or the thresholds used to trigger the warnings, and map this information to the user to determine how to control warning generation for the user.

In some embodiments, the warning generation is controlled based on a warning rate. For example, the warning rate can correspond to a number of frames of displayed images in which the warning is displayed (or when the warning is displayed with a magnitude greater than a threshold magnitude, such as if a minimal warning is often or always displayed) relative to a total number of displayed images. The warning rate can indicate a rate of immersion loss. The functions or thresholds used to determine whether to generate warnings or the parameters associated with the warnings can be adjusted to maintain the warning rate within a target range. For example, the warning rate over a particular period of time (e.g., previous number of seconds or minutes; previous usages of the application; previous use of the HMD) can be monitored, and compared to at least one of a minimum threshold or a maximum threshold; responsive to the warning rate not being outside the at least one of the minimum threshold or the maximum thresholds, the thresholds used to determine whether to trigger the warning can be adjusted so that the warning rate will increase or decrease as appropriate. In some embodiments, the thresholds used to determine whether to trigger the warning have absolute limits, which can ensure that the thresholds are not adjusted to a point at which it may be difficult for a user to react in time to avoid collisions when the warnings are displayed.

The warning can be generated responsive to a user model. The user model can include a machine learning model trained to generate the warning or trigger generation of the warning based on collision data as well as indications of when collisions occur or factors regarding when immersion is lost. The collision data can be used to update the user model. The collision data can be provided to the user model to cause the user model to generate the thresholds or parameters used to generate the warning based on the collision data.

In some embodiments, the warning is generated by mapping the location of portions of the one or more obstacles that trigger the warning to pixels of the display of the HMD. For example, the location of the portions of the one or more obstacles can be periodically sampled and updated (e.g., while the user is moving), and pixels in an image space of the images displayed by the HMD can be identified based on a direction of the user or a FOV of the HMD and the locations. In some embodiments, an angular range of pixels is used to represent the one or more obstacles in the FOV, and the angular range can be scaled based on the distance between the user and the one or more obstacles. In some embodiments, the one or more obstacles may be located outside the FOV, in which case the warning can be presented along edges or edge portions of the FOV.

At 335, display data representing the warning regarding the potential collisions is generated. The warning can be generated using icons, labels, or representations of the one or more obstacles to warn the user of the HMD of the potential collision. For example, the warning can be generated to include display data indicating gridded elements representing the one or more obstacles (e.g., gridded walls). The warning can be generated to correspond to a real-world location of the one or more obstacles relative to a direction of movement of the user, such that the warning can indicate the real-world location within the virtual environment that the user perceives. As described above, the warning can be generated at edge or edge portions of the FOV of the HMD, such as if the one or more obstacles are to the side of or behind the user. The warning can be displayed with each image that is displayed by the HMD, or can be displayed at a different frame rate that the images displayed by the HMD. The warning can be displayed using depth map data regarding the one or more obstacles. The warning can be presented as an overlay in the virtual environment displayed using the HMD. In some embodiments, the warning is an audio warning or a haptic warning such as a vibration on the hand device if the hand holding that device is about to collide with an object or a vibration on the head worn display if the head is about to strike an object.

The method 300 or steps or operations thereof can be performed based on various conditions. The method 300 can be performed responsive to detecting that the HMD or VR system is in an initialization, restart, or setup mode, such as to calibrate the locations of the one or more obstacles relative to the HMD. In some embodiments, the method 300 is performed on a periodic basis, such as to periodically detect motion data and determine whether potential collisions may occur based on the motion data. The method 300 can be performed responsive to user input, such as user input indicating instructions to detect potential collisions or to refresh the warning (e.g., present a partial or complete indication of the locations of the one or more obstacles, even if a warning would not otherwise be triggered).

Figure 4:
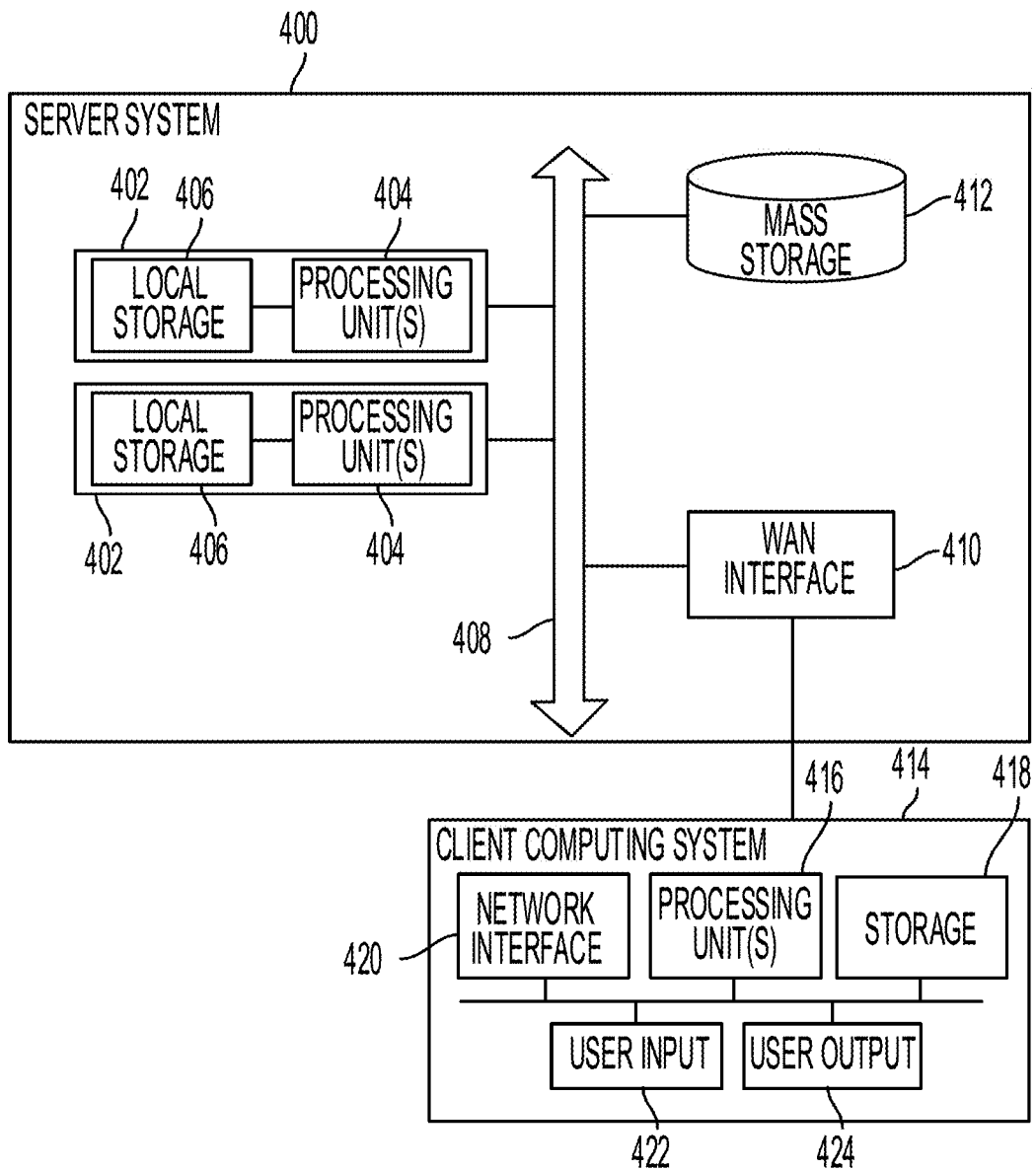
FIG. 4 is a block diagram of a computing environment according to an implementation of the present disclosure.

Various operations described herein can be implemented on computer systems. FIG. 4 shows a block diagram of a representative server system 400 and client computer system 414 usable to implement the present disclosure. Server system 400 or similar systems can implement services or servers described herein or portions thereof. Client computer system 414 or similar systems can implement clients described herein. Each of the systems 100, 200 and others described herein can incorporate features of the systems 400, 414.

Server system 400 can have a modular design that incorporates a number of modules 402 (e.g., blades in a blade server); while two modules 402 are shown, any number can be provided. Each module 402 can include processing unit(s) 404 and local storage 406.

Processing unit(s) 404 can include a single processor, which can have one or more cores, or multiple processors. Processing unit(s) 404 can include a general-purpose primary processor as well as one or more special-purpose co-processors such as graphics processors, digital signal processors, or the like. Some or all processing units 404 can be implemented using customized circuits, such as application specific integrated circuits (ASICs) or field programmable gate arrays (FPGAs). Such integrated circuits execute instructions that are stored on the circuit itself. Processing unit(s) 404 can execute instructions stored in local storage 406. Any type of processors in any combination can be included in processing unit(s) 404.

Local storage 406 can include volatile storage media (e.g., conventional DRAM, SRAM, SDRAM, or the like) and/or non-volatile storage media (e.g., magnetic or optical disk, flash memory, or the like). Storage media incorporated in local storage 406 can be fixed, removable or upgradeable as desired. Local storage 406 can be physically or logically divided into various subunits such as a system memory, a read-only memory (ROM), and a permanent storage device.

The system memory can be a read-and-write memory device or a volatile read-and-write memory, such as dynamic random-access memory. The system memory can store some or all of the instructions and data that processing unit(s) 404 need at runtime. The ROM can store static data and instructions that are needed by processing unit(s) 404. The permanent storage device can be a non-volatile read-and-write memory device that can store instructions and data even when module 402 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

Local storage 406 can store one or more software programs to be executed by processing unit(s) 404, such as an operating system and/or programs implementing various server functions such as functions of the system 100, or any other system described herein, or any other server(s) associated with the system 100 or any other system described herein.

"Software" refers generally to sequences of instructions that, when executed by processing unit(s) 404 cause server system 400 (or portions thereof) to perform various operations, thus defining one or more specific machine implementations that execute and perform the operations of the software programs. The instructions can be stored as firmware residing in read-only memory and/or program code stored in non-volatile storage media that can be read into volatile working memory for execution by processing unit(s) 404. Software can be implemented as a single program or a collection of separate programs or program modules that interact as desired. From local storage 406 (or non-local storage described below), processing unit(s) 404 can retrieve program instructions to execute and data to process in order to execute various operations described above.

In some server systems 400, multiple modules 402 can be interconnected via a bus or other interconnect 408, forming a local area network that supports communication between modules 402 and other components of server system 400. Interconnect 408 can be implemented using various technologies including server racks, hubs, routers, etc.

A wide area network (WAN) interface 410 can provide data communication capability between the local area network (interconnect 408) and a larger network, such as the Internet. Conventional or other activities technologies can be used, including wired (e.g., Ethernet, IEEE 802.3 standards) and/or wireless technologies (e.g., Wi-Fi, IEEE 802.11 standards).

Local storage 406 can provide working memory for processing unit(s) 404, providing fast access to programs and/or data to be processed while reducing traffic on interconnect 408. Storage for larger quantities of data can be provided on the local area network by one or more mass storage subsystems 412 that can be connected to interconnect 408. Mass storage subsystem 412 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 412. Additional data storage resources may be accessible via WAN interface 410 (potentially with increased latency).

Server system 400 can operate in response to requests received via WAN interface 410. For example, one of modules 402 can implement a supervisory function and assign discrete tasks to other modules 402 in response to received requests. Conventional work allocation techniques can be used. As requests are processed, results can be returned to the requester via WAN interface 410. Such operation can generally be automated. WAN interface 410 can connect multiple server systems 400 to each other, providing scalable systems capable of managing high volumes of activity. Conventional or other techniques for managing server systems and server farms (collections of server systems that cooperate) can be used, including dynamic resource allocation and reallocation.

Server system 400 can interact with various user-owned or user-operated devices via a wide-area network such as the Internet. An example of a user-operated device is shown in FIG. 4 as client computing system 414. Client computing system 414 can be implemented, for example, as a consumer device such as a smartphone, other mobile phone, tablet computer, wearable computing device (e.g., smart watch, eyeglasses), desktop computer, laptop computer, and so on.

For example, client computing system 414 can communicate via WAN interface 410. Client computing system 414 can include conventional computer components such as processing unit(s) 416, storage device 418, network interface 420, user input device 422, and user output device 424. Client computing system 414 can be a computing device implemented in a variety of form factors, such as a desktop computer, laptop computer, tablet computer, smartphone, other mobile computing device, wearable computing device, or the like.

Processor 416 and storage device 418 can be similar to processing unit(s) 404 and local storage 406 described above. Suitable devices can be selected based on the demands to be placed on client computing system 414; for example, client computing system 414 can be implemented as a "thin" client with limited processing capability or as a high-powered computing device. Client computing system 414 can be provisioned with program code executable by processing unit(s) 416 to enable various interactions with server system 400 of a message management service such as accessing messages, performing actions on messages, and other interactions described above. Some client computing systems 414 can also interact with a messaging service independently of the message management service.

Network interface 420 can provide a connection to a wide area network (e.g., the Internet) to which WAN interface 410 of server system 400 is also connected. Network interface 420 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 422 can include any device (or devices) via which a user can provide signals to client computing system 414; client computing system 414 can interpret the signals as indicative of particular user requests or information. User input device 422 can include any or all of a keyboard, touch pad, touch screen, mouse or other pointing device, scroll wheel, click wheel, dial, button, switch, keypad, microphone, and so on.

User output device 424 can include any device via which client computing system 414 can provide information to a user. For example, user output device 424 can include a display to display images generated by or delivered to client computing system 414. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 424 can be provided in addition to or instead of a display. Examples include indicator lights, speakers, tactile "display" devices, printers, and so on.

Some implementations include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 404 and 416 can provide various functionality for server system 400 and client computing system 414, including any of the functionality described herein as being performed by a server or client, or other functionality associated with message management services.

It will be appreciated that server system 400 and client computing system 414 are illustrative and that variations and modifications are possible. Computer systems used in connection with the present disclosure can have other capabilities not specifically described here. Further, while server system 400 and client computing system 414 are described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method, comprising:
  detecting, by one or more sensors, first velocity data of a head mounted display (HMD) and second velocity data of a hand device associated with the HMD;
  identifying, by one or more processors, one or more obstacles in an environment around the HMD; and
  providing, by the one or more processors using the HMD, display data representing a warning regarding potential collision with the one or more obstacles in response to:
    (i) a first threshold being met by a function of the first velocity data of the HMD and the second velocity data of the hand device; and
    (ii) a second threshold being met by a function of a first distance between the HMD and the one or more obstacles and a second distance between the hand device and the one or more obstacles.

2. The method of claim 1, further comprising:
  determining, by the one or more processors, the warning with greater sensitivity to the first velocity data than the second velocity data.

3. The method of claim 1, further comprising:
  determining, by the one or more processors, the warning based on at least one of a predetermined characteristic of reach of a hand of a user of the HMD or a threshold distance corresponding to movement of a head of the user indicated by the first velocity data.

4. The method of claim 1, further comprising:
  identifying, by the one or more processors, a field of view of the HMD;
  determining, by the one or more processors, an angular range corresponding to an extent of a first obstacle of the one or more obstacles in the field of view; and
  generating, by the one or more processors, the warning at a location in the field of view associated with the angular range.

5. The method of claim 1, further comprising:
  identifying, by the one or more processors, a peripheral region of a field of view of the HMD and a central region separate from the peripheral region; and
  generating, by the one or more processors, the warning to have a first intensity in the peripheral region greater than a second intensity in the central region.

6. The method of claim 1, further comprising:
   determining, by the one or more processors, an average value of at least one of the first velocity data or the second velocity data over a predetermined duration of time; and
   using, by the one or more processors, the average value to determine the warning.

7. The method of claim 1, further comprising:
   determining, by the one or more processors, a depth map regarding the one or more obstacles; and
   determining, by the one or more processors, the warning based on the depth map.

8. The method of claim 1, further comprising:
   identifying, by the one or more processors, at least one of a user profile or a model of user movement corresponding to a user of the HMD; and
   determining, by the one or more processors, the warning based on the at least one of the user profile or the model of user movement.

9. The method of claim 1, further comprising:
   identifying, by the one or more processors, an application operated by the one or more processors; and
   determining, by the one or more processors, the warning based on the identified application.

10. The method of claim 1, further comprising:
    determining, by the one or more processors, the warning based on at least one of a size metric of the environment or a motion metric regarding one or more prior movements performed by a user of the HMD.

11. The method of claim 1, further comprising:
    determining, by the one or more processors, the distance between the HMD and the one or more obstacles or the hand device and the one or more obstacles based on a respective first size buffer corresponding the HMD or a second size buffer corresponding to the hand device, the first size buffer greater than the second size buffer.

12. The method of claim 1, further comprising:
    reducing, by the one or more processors, an intensity of the warning responsive to at least one of the first velocity data or the second velocity data being less than a respective motion data threshold.

13. The method of claim 1, further comprising determining at least one of the first velocity data or the second velocity data from acceleration data.

14. The method of claim 1, further comprising:
    determining, by the one or more processors, a parameter indicative of at least one of a distance to the one or more obstacles or a time to collision with the one or more obstacles using the first velocity data and the second velocity data; and
    generating, by the one or more processors, the warning regarding the potential collision in response to the parameter.

15. A system, comprising:
    one or more sensors configured to detect first motion data of a head mounted display (HMD) and second motion data of a hand device associated with the HMD, the first motion data comprising at least one of velocity or acceleration, the second motion data comprising at least one of velocity or acceleration; and
    processing circuitry configured to:
       identify one or more obstacles in an environment around the HMD; and
       provide, using the HMD, display data representing a warning regarding potential collision with the one or more obstacles in response to:
          (i) a first threshold being met by a function of the first velocity data of the HMD and the second velocity data of the hand device; and
          (ii) a second threshold being met by a function of a first distance between the HMD and the one or more obstacles and a second distance between the hand device and the one or more obstacles.

16. The system of claim 15, wherein the processing circuitry is further configured to determine the warning by assigning a first weight to the first motion data and a second weight to the second motion data, the first weight being greater than the second weight.

17. The system of claim 15, wherein the one or more sensors configured to detect the first motion data comprise at least one of an accelerometer, a gyroscope, or a magnetometer, the one or more sensors configured to generate the at least one of the first motion data or the second motion data to include at least one of velocity data or acceleration data.

18. The system of claim 15, wherein the processing circuitry is further configured to determine the warning responsive to identifying an application operated by the processing circuitry.

19. A head mounted display (HMD) device, comprising:
    a display; and
    processing circuitry configured to:
       cause the display to provide a warning regarding potential collision with an obstacle in an environment of the HMD in response to:
          (i) a first threshold being met by motion data associated with movement of a user of the HMD and a hand device associated with the HMD, the motion data comprising at least one of velocity or acceleration; and
          (ii) a second threshold being met by a function of a distance to the obstacle from the HMD and a distance to the obstacle from the hand device.

20. The HMD of claim 19, wherein the processing circuitry is further configured to determine the warning based on an average value of the motion data over a predetermined duration of time.

* * * * *